United States Patent [19]

Givens

[11] 4,180,727
[45] Dec. 25, 1979

[54] GAMMA-GAMMA DENSITY LOGGING METHOD

[75] Inventor: Wyatt W. Givens, Dallas, Tex.

[73] Assignee: Mobil Oil Corporation, New York, N.Y.

[21] Appl. No.: 843,909

[22] Filed: Oct. 20, 1977

[51] Int. Cl.$^2$ .............................................. G01V 5/00
[52] U.S. Cl. ..................................... 250/264; 250/269
[58] Field of Search ........................ 250/264, 269, 265

[56] References Cited

U.S. PATENT DOCUMENTS

| | | | |
|---|---|---|---|
| Re. 24,471 | 5/1958 | Herzog | 250/265 |
| 3,151,242 | 9/1964 | Hall, Jr. | 250/265 |
| 4,048,495 | 9/1977 | Ellis | 250/264 |

Primary Examiner—Alfred E. Smith
Assistant Examiner—Janice A. Howell
Attorney, Agent, or Firm—C. A. Huggett; William D. Jackson; William J. Scherback

[57] ABSTRACT

A gamma-gamma density logging tool employs a gamma-ray source and a pair of gamma-ray detectors. A first detector receives only natural gamma rays from the formations surrounding the borehole. A second detector receives both natural gamma rays and scattered gamma rays from the formations surrounding the borehole. The count rate from the second detector is modified by the count rate of the first detector to provide for a density measurement that is corrected for the effects of natural gamma radiation from radioactive ore-bearing zones in the formations.

5 Claims, 4 Drawing Figures

GAMMA-GAMMA DENSITY LOGGING METHOD

BACKGROUND OF THE INVENTION

This invention relates to gamma-gamma density logging and more particularly to the correction of density logs obtained from radioactive zones in subsurface formations for the effects of natural gamma radiation from the radioactive materials.

In gamma-gamma density logging, formations surrounding a borehole are irradiated with gamma rays. These gamma rays are scattered through the formation and those returning to the borehole are detected. The count rate of gamma rays detected are recorded as a density log of the formation surrounding the borehole.

However, in formations of high natural gamma-ray activity, such as uranium ore formations, the high intensity of natural gamma rays from the formation adds to the intensity of gamma rays that would otherwise reach the detector. Such additional gamma rays result in a gamma-ray count rate indicative of an erroneous density that is lower than the actual density.

SUMMARY OF THE INVENTION

In accordance with the present invention, a method is provided for measuring the density of radioactive ore-bearing formations surrounding a borehole by employing a logging sonde having a gamma-ray source and a pair of gamma-ray detectors. A proportionality constant K relating the count rate of one of the gamma-ray detectors to the other of the gamma-ray detectors is determined when both detectors are measuring natural gamma rays from the same radioactive formation. This measurement needs only be made once for a particular logging sonde and provides both the constant of proportionality K and the effective distance between the two detectors. This distance is in the order of several feet and is great enough that the detector farthest from the source does not detect scattered gamma rays from the source. This distance is needed in order to properly correct the count rate of the detector nearest the source for counts from natural gamma rays. The formations surrounding the borehole are then logged by advancing the logging sonde through the borehole while irradiating the formations with gamma rays. A first count-rate signal is produced by detecting natural gamma rays with one of the detectors, and a second count-rate signal is produced by detecting both natural gamma rays and scattered gamma rays with the other of the detectors. The first count-rate signal is modified by the proportionality constant K. The second count-rate signal is then corrected by the modified first count-rate signal to produce a density log of the formations surrounding the borehole that is free from the adverse effects of natural gamma radiation from the ore-bearing zones.

DESCRIPTION OF THE PREFERRED EMBODIMENTS

In the gamma-gamma density logging of formations having radioactive materials, the high-intensity natural gamma rays from the radioactive materials result in a gamma-ray count rate indicative of an erroneous density lower than the actual density. It is a specific feature of the present invention to provide a method by which a gamma-gamma density measurement is corrected for the effects of the natural gamma radiation in the formation. In carrying out this method, a logging sonde is employed having a first gamma-ray detector that will be exposed to natural gamma rays, and a second detector that will be exposed to both natural gamma rays and scattered gamma rays of the density measurement.

Initially, the sonde is lowered into a borehole without a gamma-ray source so as to expose both gamma-ray detectors to only the natural gamma rays of the radioactive material in the formations surrounding the borehole. The dead-time corrected count rates from the detectors for a particular radioactive zone in the formations are related by a constant K:

$$C_{n\gamma s} = K C_{n\gamma l} \tag{1}$$

where, $C_{n\gamma s}$ = the natural gamma count rate for the short-spaced detector, and $C_{n\gamma l}$ = the natural gamma count rate for the long-spaced detector.

The short-spaced detector is located nearest the gamma-ray source and the long-spaced detector is located farthest from the gamma-ray source.

After this initial step in which the constant K and the effective separation of the two detectors are determined for a sonde, the borehole is logged by advancing the sonde through the borehole with a gamma-ray source. During this logging operation, the short-spaced detector receives both scattered gamma rays and any natural gamma rays from radioactive zones, while the long-spaced detector receives only natural gamma rays through a proper choice of either shielding or spacing. The output from this short-spaced detector is defined by the following relationship:

$$C_{ts} = C_{\gamma\gamma s} + C_{n\gamma s} \tag{2}$$

where, $C_{ts}$ = the total dead-time corrected gamma count rate, and $C_{\gamma\gamma s}$ = the dead-time corrected scattered gamma count rate.

By rearranging Equation (2) and substituting for the relationship of Equation (1), the dead-time scattered gamma count rate can be expressed as follows:

$$C_{\gamma\gamma s} = C_{ts} - K C_{n\gamma l} \tag{3}$$

Consequently, the term $C_{\gamma\gamma s}$ is representative of the gamma-gamma density measurement of the formation corrected for the effects of natural radiation from radioactive materials in the formation. Actual density may be calculated using $C_{\gamma\gamma s}$ and an experimentally determined calibration function relating $C_{\gamma\gamma s}$ to density.

Figure 1:
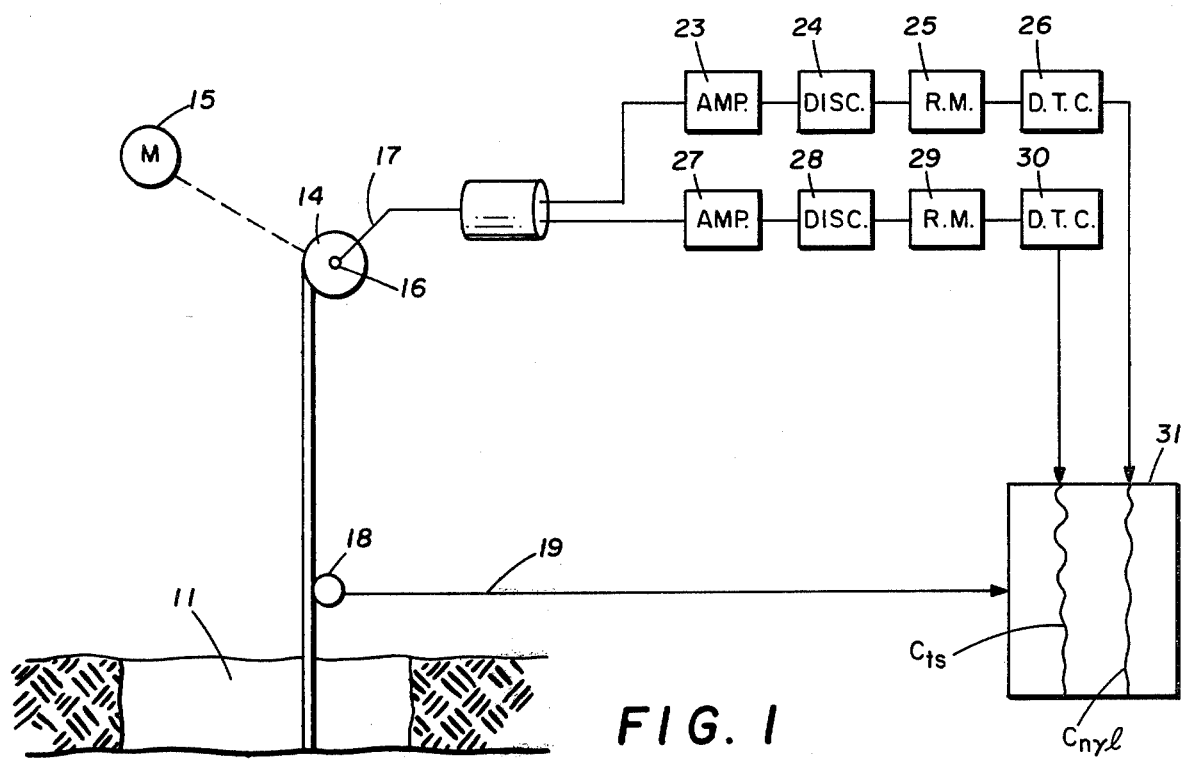
FIGS. 1-3 illustrate alternate embodiments of a downhole logging sonde and uphole recording equipment for use in carrying out the density logging of radioactive formations of the present invention.

One embodiment of a logging system for carrying out the gamma-gamma density logging method of the present invention is illustrated in FIG. 1. A formation to be investigated is shown at 10. It is traversed by a borehole 11. Density logging is carried out by lowering the sonde 12 into the borehole to the level of the formation 10. The sonde 12 is suspended in the borehole 11 by means of a logging cable 13. This cable is driven from the drum 14 by the motor 15. Slip rings 16 and brushes 17 are employed to couple the conductors of cable 13 to the uphole recording system. Within the sonde 12, a short-spaced gamma-ray detector 21 is located near a gamma-ray source 20, while a long-spaced gamma-ray detector 22 is spaced sufficiently far from the gamma-ray source 20 so as to be nonresponsive to scattered gamma rays from the source. A preferable distance for such spacing is in the order of 6 to 7 feet. The output from the long-spaced detector 22 is applied uphole through the amplifier 23, discriminator 24, count-rate meter 25, and dead-time corrector 26 to the recorder 31 for the production of a log of the natural gamma-ray count rate $C_{n\gamma l}$. In similar manner, the output from the short-spaced detector 21 is applied uphole through the amplifier 27, discriminator 28, count-rate meter 29, and dead-time corrector 30 to the recorder 31 for the production of a log of the total dead-time gamma count rate $C_{ts}$. Recorder 31 is driven in correlation with the depth of the sonde 12 in the borehole by means of the reel 18 and connection 19.

With the detectors 21 and 22 spaced several feet apart, one of the detectors will begin responding to natural gamma rays from a radioactive zone prior to the other detector. Consequently, the gamma-gamma density of the formation is determined in accordance with the relationship of Equation (3) after correction for differences in depth for the $C_{ts}$ and $C_{n\gamma l}$ logs.

Figure 2:
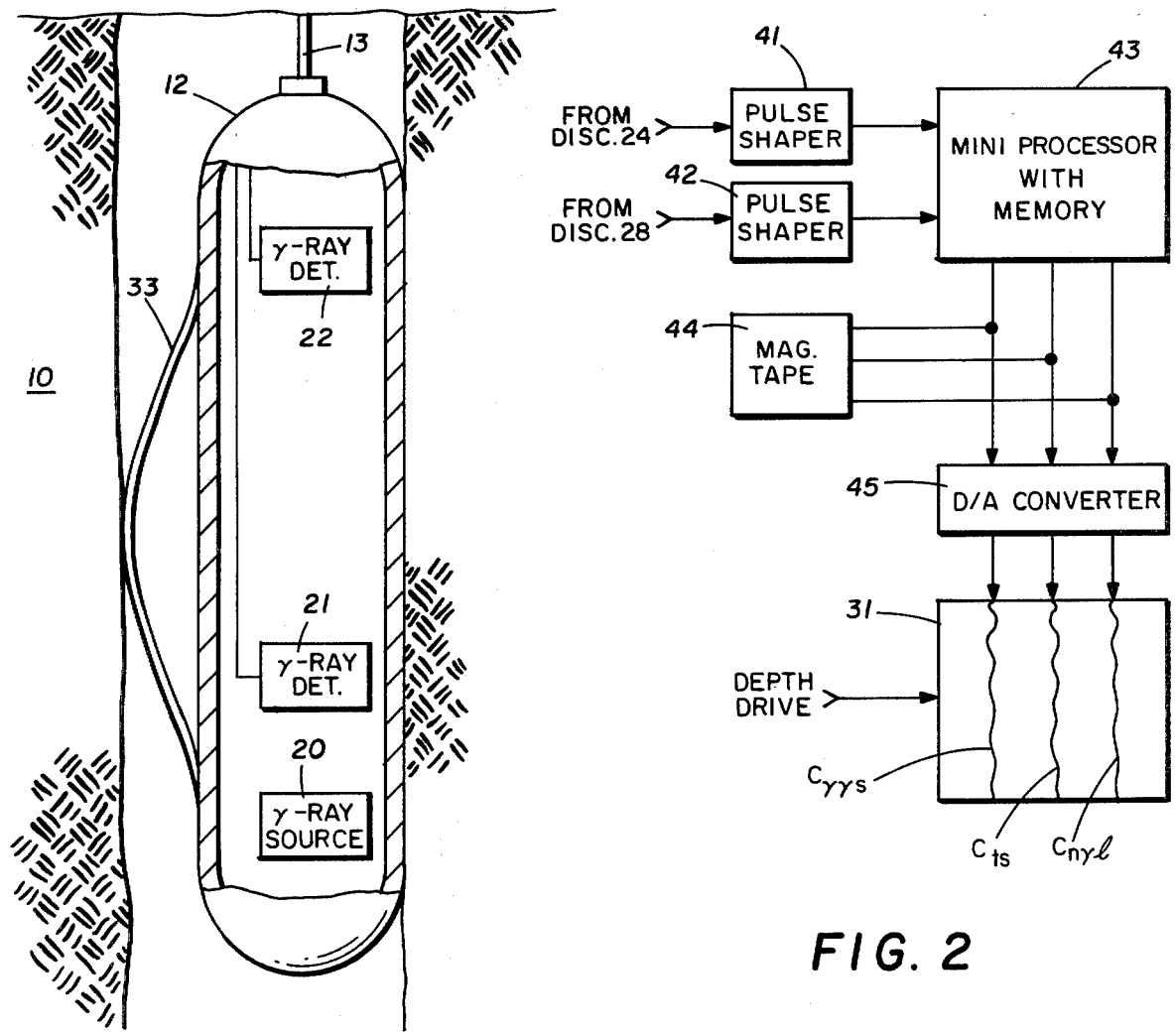

In lieu of recording the $C_{ts}$ and $C_{n\gamma l}$ logs ad thereafter determining density in accordance with Equation (3), the density may be determined and recorded in real time. Such real-time operation may be carried out by replacing the count-rate meters 25 and 29 and dead-time correctors 26 and 30 with the pulse shapers 41 and 42 and miniprocessor 43 of FIG. 2. With such circuitry, the outputs from the two gamma-ray detectors are digitized on a selected time base, 1 or 2 seconds, for example; and the digitized output from the long-spaced detector 22 is stored in the memory of miniprocessor 43 in correlation with depth until a measurement is made at the same depth by the short-spaced detector 21. At that time, the miniprocessor 43 processes the data to provide for the corrected density representation $C_{\gamma\gamma s}$. The three outputs from the miniprocessor, the natural gamma-ray count rate $C_{n\gamma l}$, the total count rate $C_{ts}$, and the density representation $C_{\gamma\gamma s}$, may be digitally recorded on magnetic tape recorder 44 or may be converted to analog format by way of the D/A converter 45 for recording on the log recorder 31. Other forms of recording may also be provided.

In determining the constant K and the effective distance between the short- and long-spaced detectors, the sonde is located in successive positions in the borehole such that the short-spaced detector 21 and the long-spaced detector 22 are both exposed to the natural gamma radiation from the same radioactive zone of the formation. In both instances, the gamma-ray source 20 must be removed to prevent scattered gamma rays from affecting the natural gamma-ray response of the short-spaced detector 21.

Figure 3:
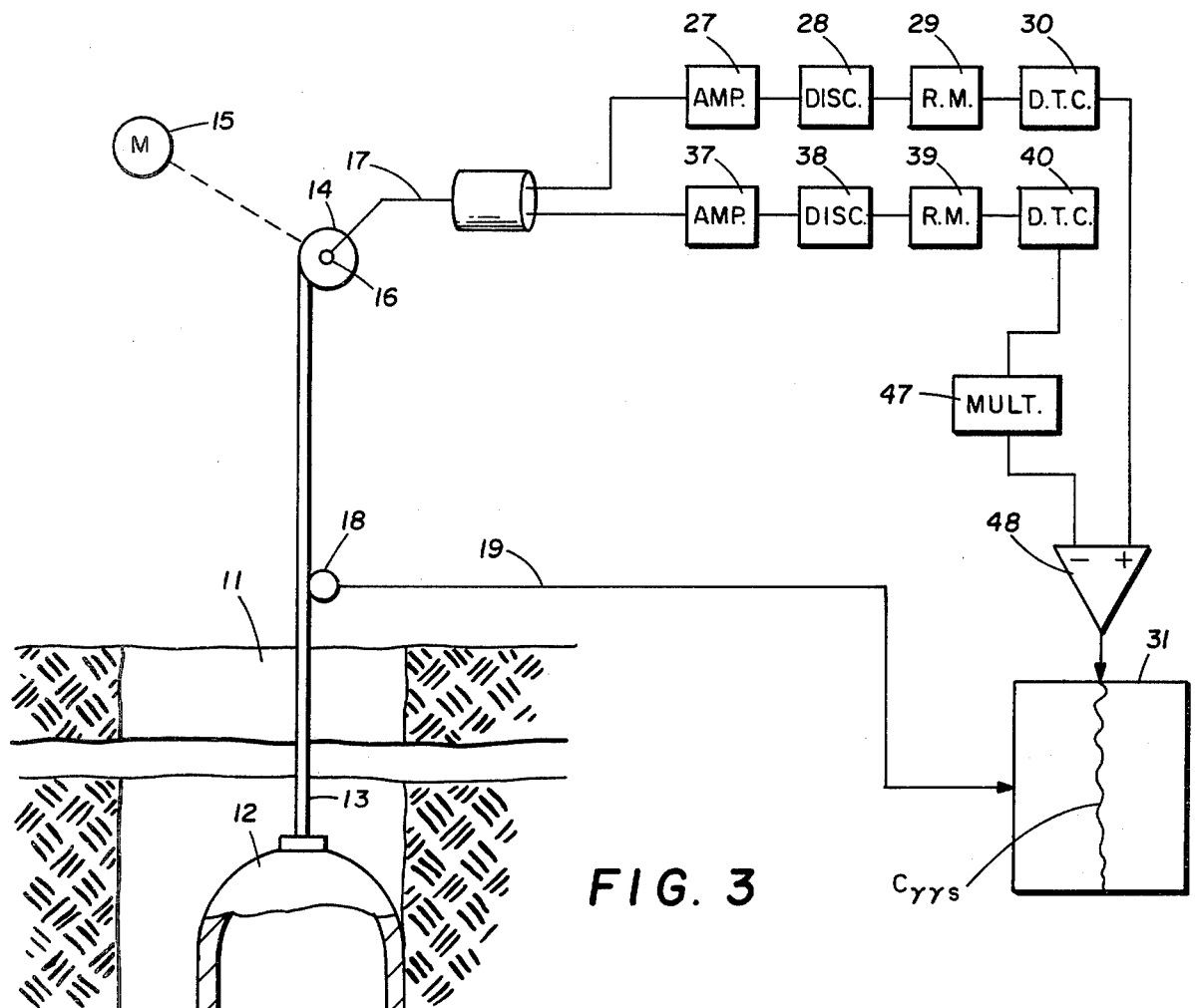

Another embodiment of a logging system for carrying out the gamma-gamma density logging method of the present invention is illustrated in FIG. 3. In this embodiment, a second short-spaced gamma-ray detector 32 is added to provide for the correction to the gamma-gamma density measurement of the natural gamma radiation. This correction is carried out in real time since both detectors 21 and 32 are located within a few inches of each other and therefore respond simultaneously to the same radioactive zone. In order to provide such correction, the detector 32 must be shielded from the scattered gamma rays. This is accomplished by collimating the source 20 and both detectors 21 and 32 with suitable shielding material 46. The sonde is held against the borehole wall by the bow spring 33 so that the gamma rays from the source 20 leave the sonde by way of the slot 34 within the shielding material and directly enter the formation without passing through the borehole fluid. The detector 21 receives the scattered gamma rays from the formation through the slot 35 within the shielding material and on the same side of the sonde as the source slot 34 is located. The detector 32, on the other hand, receives gamma rays through the slot 36 located on the opposite side of the sonde from the slots 34 and 35. Detector 32 therefore views the same formation as detector 21. However, only natural gamma rays from radioactive zones will enter through the slot 36.

In addition to the uphole circuitry already described in conjunction with FIG. 1, this embodiment of FIG. 3 further includes the amplifier 37, discriminator 38, count-rate meter 39, and dead-time corrector 40 to which the output of detector 32 is applied. The output from the dead-time corrector 40 is the dead-time natural gamma-ray count rate $C_{n\gamma s}$ (but from a short-spaced detector as contrasted with being from a long-spaced detector in the other described embodiment of FIG. 1). The multiplier 47 provides for the product of the constant K and the $C_{n\gamma s}$ count rate. The operational amplifier 48 then functions to provide a difference signal between the $C_{ts}$ count rate and the $C_{n\gamma s}$ count rate. This provides for the gamma-gamma density measurement $C_{\gamma\gamma s}$ which is recorded as the gamma-gamma density log on the recorder 31 in accordance with the following relationship:

$$C_{\gamma\gamma s} = C_{ts} - KC_{n\gamma s} \qquad (4)$$

Figure 4:
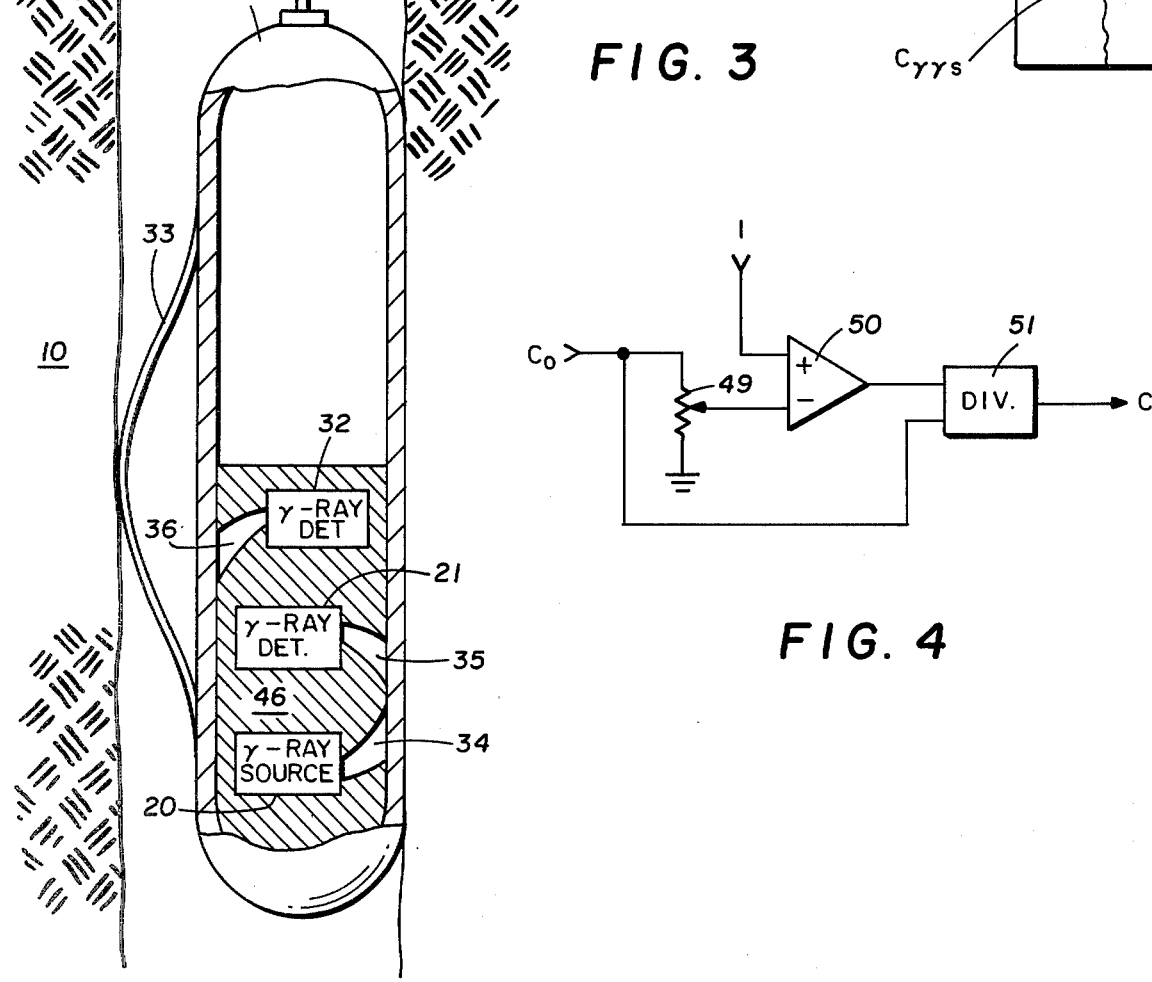
FIG. 4 is an electrical schematic of the dead-time correction circuits of FIGS. 1 and 3.

The dead-time correctors 26, 30, and 40 of FIGS. 1 and 3 may conventionally employ the variable resistor 49, operational amplifier 50, and divider 51 as shown in FIG. 4 to carry out the dead-time corrections in accordance with the following relationship:

$$C = C_o/(1 - C_o t) \qquad (5)$$

where,
 C=dead-time correction,
 $C_o$=observed count rate, and
 t=dead time.

Various modifications to the disclosed embodiments as well as alternate embodiments may become apparent to one skilled in the art without departing from the scope and spirit of the invention as defined by the appending claims.

I claim:

1. A method of measuring the density of radioactive ore-bearing formations surrounding a borehole employing a logging sonde having a gamma-ray source and a pair of gamma-ray detectors, comprising the steps of:
   (a) determining a proportionality constant K relating the count rate of one of said pair of gamma-ray detectors to the other of said gamma-ray detectors when both detectors are measuring natural gamma rays from the same radioactive formation, and (b) logging the formations surrounding the borehole by:
  (i) advancing the logging sonde through the borehole while irradiating the formations with gamma rays,
  (ii) producing a first count-rate signal by detecting only natural gamma rays with a first of said detectors,
  (iii) producing a second count-rate signal by detecting both scattered gamma rays and natural gamma rays with a second of said detectors,
  (iv) modifying said first count-rate signal by the proportionality constant K, and
  (v) correcting said second count-rate signal by said modified first count-rate signal to produce a density log of the formations surrounding the borehole.

2. The method of claim 1 wherein the step of producing a first count-rate signal is carried out by locating said second gamma-ray detector from the gamma-ray source such that scattered gamma rays returning from the formation are not counted by said first detector.

3. The method of claim 1 wherein the step of producing a first count-rate signal is carried out by locating both said first gamma-ray detector and said second gamma-ray detector such that both detectors are responsive to the same formation at the same time, said first detector being shielded from the scattered gamma rays returning from the formation.

4. The method of claim 3 wherein:
  (a) said gamma-ray source irradiates the formation on one side of the borehole,
  (b) said second detector views only those gamma rays from the formation on the irradiated side of the borehole, and
  (c) said first detector views only those gamma rays from the formation on the nonirradiated side of the borehole.

5. A method of measuring the density of radioactive ore-bearing formations surrounding a borehole employing a logging sonde having a gamma-ray source and short- and long-spaced gamma-ray detectors, comprising the steps of:
  (a) measuring the natural gamma radiation of a select formation with both said short- and long-spaced gamma-ray detectors,
  (b) determining the proportionality constant K between the count rates $C_{n\gamma s}$ and $C_{n\gamma l}$ of said short- and long-spaced detectors respectively in accordance with the following:

$$C_{n\gamma s} = K C_{n\gamma l},$$

(c) advancing the logging sonde through the borehole and irradiating the formations with gamma rays,
  (d) detecting the total count rate $C_{ts}$ from said short-spaced gamma-ray detector and the natural gamma radiation count rate $C_{n\gamma l}$ from said long-spaced gamma-ray detector as the logging sonde irradiates the formations throughout the borehole with gamma rays, and
  (e) determining the scattered gamma count rate $C_{\gamma\gamma s}$ of said formation throughout the borehole in accordance with the following:

$$C_{\gamma\gamma s} = C_{ts} - K C_{n\gamma l},$$

said scattered gamma count rate being representative of the density of the radioactive ore-bearing formations surrounding the borehole.

* * * * *